United States Patent
Kuriakose et al.

(10) Patent No.: US 8,254,274 B2
(45) Date of Patent: Aug. 28, 2012

(54) METHOD FOR PROVIDING NETWORK INFORMATION

(75) Inventors: Anil Abraham Kuriakose, Karnataka (IN); Deepthi Bhushan, Karnataka (IN); Kotilingareddy Bhavanam, Karnataka (IN); Muthukumar Suriyanarayanan, Karnataka (IN); Swamy Jagannadha Mandavilli, Karnataka (IN); Venkatesh Mahalingam, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 323 days.

(21) Appl. No.: 12/686,400

(22) Filed: Jan. 13, 2010

(65) Prior Publication Data

US 2011/0085555 A1 Apr. 14, 2011

(30) Foreign Application Priority Data

Oct. 14, 2009 (IN) .......................... 2496/CHE/2009

(51) Int. Cl.
*G01R 31/08* (2006.01)

(52) U.S. Cl. ....................................................... 370/248

(58) Field of Classification Search .................. None
See application file for complete search history.

(56) References Cited

U.S. PATENT DOCUMENTS

| | | | | |
|---|---|---|---|---|
| 7,623,531 B2 * | 11/2009 | McAllister et al. | ........... | 370/401 |
| 7,724,673 B2 * | 5/2010 | Susilo | .......... | 370/236.2 |
| 7,733,876 B2 * | 6/2010 | Davie et al. | ............. | 370/395.53 |
| 7,782,847 B2 * | 8/2010 | Hua et al. | ....................... | 370/389 |
| 7,899,044 B2 * | 3/2011 | Rusmisel et al. | ............. | 370/389 |
| 7,948,900 B2 * | 5/2011 | Hart et al. | ..................... | 370/238 |
| 7,983,174 B1 * | 7/2011 | Monaghan et al. | .......... | 370/242 |
| 8,045,492 B2 * | 10/2011 | Balus et al. | .................... | 370/290 |
| 2008/0291196 A1 * | 11/2008 | Ceruti et al. | .................. | 345/418 |
| 2008/0294989 A1 * | 11/2008 | Ceruti et al. | .................. | 715/711 |
| 2008/0298259 A1 * | 12/2008 | Susilo | .......................... | 370/248 |
| 2011/0085555 A1 * | 4/2011 | Kuriakose et al. | ........ | 370/395.53 |

* cited by examiner

*Primary Examiner* — Robert Wilson (57) ABSTRACT

Embodiments of the present invention provide a method of providing network information, comprising determining one or more pseudowires between nodes in a network; grouping the pseudowires, according to information associated with each pseudowire and one or more predetermined criteria, into one or more groups each representing a virtual private network (VPN); providing a graphical user interface (GUI) displaying information associated with at least one pseudowire participating in the virtual private network.

14 Claims, 12 Drawing Sheets

| 310 | 320 | 330 | 340 | 350 | 360 | 370 | 380 | 390 | 395 |
|---|---|---|---|---|---|---|---|---|---|
| Status | ID | Encapsulation | LER1 | LER1 Address | LER2 | LER2 Address | VPN Type | VPN Name | Status Updated |
| ☑ | 192 | basicCesPsn | mplspe512 | 10.10.10.3 | mplspe513 | 10.10.10.4 | VPWS | basicCesPsn150-200 | Apr 25, 2009 12:32 |
| ☑ | 191 | basicCesPsn | mplspe512 | 10.10.10.3 | mplspe513 | 10.10.10.4 | VPWS | basicCesPsn150-200 | Apr 25, 2009 12:32 |
| ☑ | 146 | basicCesPsn | mplspe511 | 10.10.10.2 | mplspe510 | 10.10.10.1 | VPWS | basicCesPsnLess150 | Apr 25, 2009 12:15 |

| 410 | 420 | 430 | 440 | 450 |
|---|---|---|---|---|
| Status | VPN Name | VPN ID | No. of PWVCs | Status Updated |
| ☑ | VPLS_176 | 176 | 1 | Apr 25, 2009 12:15 |
| ☑ | VPLS_177 | 177 | 1 | Apr 25, 2009 12:15 |
| ☑ | VPLS_1234567891 | 1234567891 | 10 | Apr 25, 2009 12:15 |

| Status 510 | ID 520 | Encapsulation 530 | LER1 540 | LER1 Address 550 | LER2 560 | LER2 Address 570 | Status Updated 580 |
|---|---|---|---|---|---|---|---|
| ✓ | 1234567891 | Ethernet | mplspe511 | 10.10.10.2 | mplspe510 | 10.10.10.5 | Apr 25, 2009 12:15 |
| ✓ | 1234567891 | Ethernet | mplspe511 | 10.10.10.2 | mplspe513 | 10.10.10.4 | Apr 25, 2009 12:15 |
| ✓ | 1234567891 | Ethernet | mplspe512 | 10.10.10.3 | mplspe511 | 10.10.10.2 | Apr 25, 2009 12:15 |
| ✓ | 1234567891 | Ethernet | mplspe511 | 10.10.10.2 | mplspe510 | 10.10.10.1 | Apr 25, 2009 12:15 |
| ✓ | 1234567891 | Ethernet | mplspe512 | 10.10.10.3 | mplspe510 | 10.10.10.1 | Apr 25, 2009 12:15 |
| ✓ | 1234567891 | Ethernet | mplspe510 | 10.10.10.1 | mplspe513 | 10.10.10.4 | Apr 25, 2009 12:15 |
| ✓ | 1234567891 | Ethernet | mplspe512 | 10.10.10.3 | mplspe513 | 10.10.10.4 | Apr 25, 2009 12:15 |
| ✓ | 1234567891 | Ethernet | mplspe510 | 10.10.10.1 | mplspe510 | 10.10.10.5 | Apr 25, 2009 12:15 |
| ✓ | 1234567891 | Ethernet | mplspe513 | 10.10.10.4 | mplspe510 | 10.10.10.5 | Apr 25, 2009 12:15 |

Fig. 6

| Status | Source | Destination | AC Name | AC Description | PSN Type |
|---|---|---|---|---|---|
| 610 | 620 | 630 | 640 | 650 | 660 |
| ✓ | mplspe511 | 10.10.10.5 | eth1/8 | VPLS-2 | MPLS |
| ✓ | mplspe510 | 10.10.10.2 | eth1/6 | VPLS-2 | MPLS |

| Status | L2VPN Name | No. of PseudoWireVCs | Status Updated |
|---|---|---|---|
| 710 | 720 | 730 | 740 |
| ✗ | Default Group | 1 | Apr 25, 2009 12:15 |
| ⋯ | HP | 2 | Apr 25, 2009 12:15 |
| ⋯ | HP India | 2 | Apr 25, 2009 12:15 |
| ✓ | BasicCesPsn 150-200 | 10 | Apr 25, 2009 12:15 |
| ✓ | BasicCesPsn Less 150 | 10 | Apr 25, 2009 12:15 |

| 810 Status | 820 ID | 830 Encapsulation | 840 LER1 | 850 LER1 Address | 860 LER2 | 870 LER2 Address | 880 Status Updated |
|---|---|---|---|---|---|---|---|
| ☑ | 200 | basicCesPsn | mplspe512 | 10.10.10.3 | mplspe513 | 10.10.10.4 | Apr 25, 2009 12:15 |
| ☑ | 191 | basicCesPsn | mplspe512 | 10.10.10.3 | mplspe513 | 10.10.10.4 | Apr 25, 2009 12:15 |
| ☑ | 192 | basicCesPsn | mplspe512 | 10.10.10.3 | mplspe513 | 10.10.10.4 | Apr 25, 2009 12:15 |
| ☑ | 193 | basicCesPsn | mplspe512 | 10.10.10.3 | mplspe513 | 10.10.10.4 | Apr 25, 2009 12:15 |
| ☑ | 194 | basicCesPsn | mplspe512 | 10.10.10.3 | mplspe513 | 10.10.10.4 | Apr 25, 2009 12:15 |
| ☑ | 195 | basicCesPsn | mplspe512 | 10.10.10.3 | mplspe513 | 10.10.10.4 | Apr 25, 2009 12:15 |
| ☑ | 196 | basicCesPsn | mplspe512 | 10.10.10.3 | mplspe513 | 10.10.10.4 | Apr 25, 2009 12:15 |
| ☑ | 197 | basicCesPsn | mplspe512 | 10.10.10.3 | mplspe513 | 10.10.10.4 | Apr 25, 2009 12:15 |
| ☑ | 198 | basicCesPsn | mplspe512 | 10.10.10.3 | mplspe513 | 10.10.10.4 | Apr 25, 2009 12:15 |
| ☑ | 199 | basicCesPsn | mplspe512 | 10.10.10.3 | mplspe513 | 10.10.10.4 | Apr 25, 2009 12:15 |

| Status | Source | Destination | AC Name | AC Description | Status Updated |
|---|---|---|---|---|---|
| ☑ | mplspe512 | 10.10.10.4 | CEM0/2/50 | PW VC to node 6 | Apr 25, 2009 12:15 |
| ☑ | mplspe513 | 10.10.10.3 | CEM0/2/50 | PW VC to node 6 | Apr 25, 2009 12:15 |

| Status | L2VPN Name | VPN ID | No. of Pseudowires | Status Updated |
|---|---|---|---|---|
| ☑ | VPLS_1234567890 | 1234567890 | 10 | Apr 25, 2009 12:15 |
| ☑ | VPLS_1234567891 | 1234567891 | 10 | Apr 25, 2009 12:15 |
| ☑ | VPLS_1234567892 | 1234567892 | 10 | Apr 25, 2009 12:15 |
| ☑ | VPLS_1234567893 | 1234567893 | 10 | Apr 25, 2009 12:15 |
| ☑ | VPLS_1234567894 | 1234567894 | 10 | Apr 25, 2009 12:15 |

1010 / 1020 / 1030 / 1040 / 1050

1000

| Status | L2VPN Name | No. of Pseudowires | Status Updated |
|---|---|---|---|
| ☑ | basicCesPsn 150-200 | 10 | Apr 25, 2009 12:15 |
| ☑ | BasicCesPsn Less 150 | 10 | Apr 25, 2009 12:15 |
| ☑ | Default Group | 1 | Apr 25, 2009 12:15 |

Fig. 12

METHOD FOR PROVIDING NETWORK INFORMATION

RELATED APPLICATIONS

Benefit is claimed under 35 U.S.C. 119(a)-(d) to Foreign application Serial No. 2496/CHE/2009 entitled "METHOD FOR PROVIDING NETWORK INFORMATION" by Hewlett-Packard Development Company, L.P., filed on Oct. 14, 2009, which is herein incorporated in its entirety by reference for all purposes.

BACKGROUND

Multiprotocol Label Switching (MPLS) is a network protocol defined by the Internet Engineering Task Force (IETF). MPLS allows packets or frames to be forwarded over a network by means of labels attached to the packets or frames. Packets may be routed over networks such as ATM, frame relay or Ethernet. In particular, MPLS is used to support IP routing, for example IP-over-ATM.

A Virtual Private Network (VPN) may be established over MPLS to provide end-to-end connectivity. Frequently, a VPN is established which forwards packets based on Layer 2 (in the OSI reference model) information and is known as a L2 VPN. A VPN is established in a MPLS network between routers at edges of the network, known as Label Edge (LE) routers. A L2 VPN is formed by one or more bi-directional pseudowires (PW) formed by two unidirectional Virtual Circuit (VC) label switching paths. Each VPN may comprise a large number of PWs and consequently PWs.

It is an object of embodiments of the invention to at least mitigate one or more of the problems of the prior art.

BRIEF DESCRIPTION OF THE DRAWINGS

Embodiments of the invention will now be described by way of example only, with reference to the accompanying figures, in which.

DETAILED DESCRIPTION OF EMBODIMENTS OF THE INVENTION

Embodiments of the present invention provide methods and apparatus for managing virtual private networks (VPNs). Embodiments of the invention identify virtual circuit label switched paths forming pseudowires (PWs) in a VPN. Embodiments of the invention provide a graphical user interface (GUI) for managing PWs in a VPN.

Figure 1:
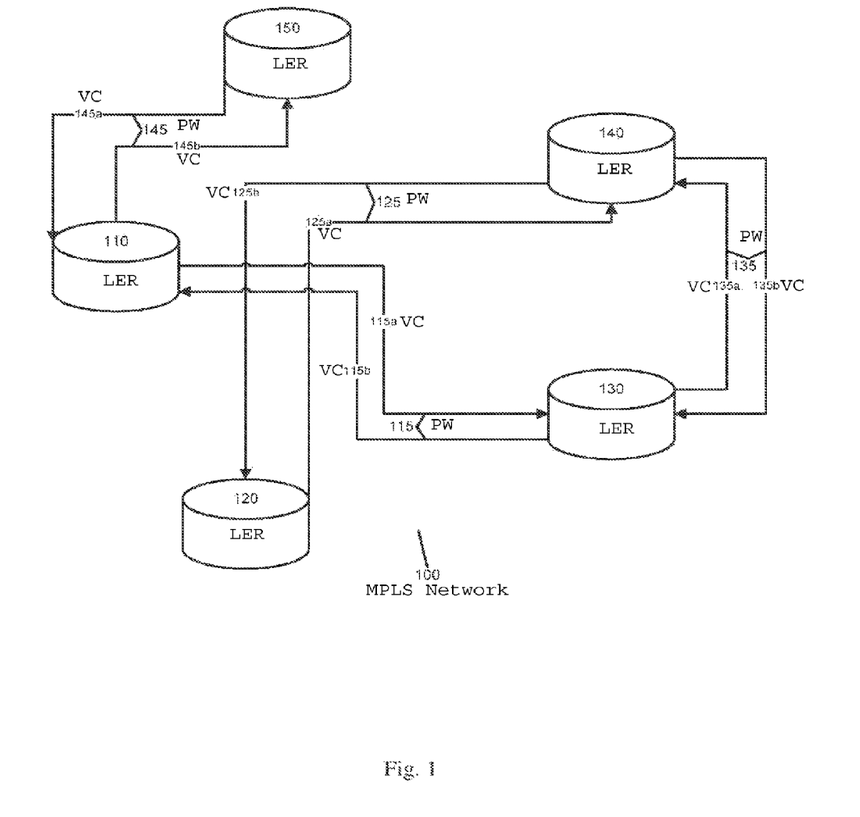
FIG. 1 shows an example MPLS network.

Referring to FIG. 1 an example MPLS network 100 is shown. The network 100 comprises five label edge routers (LERs) 110, 120, 130, 140, 150, which may also be known as provider edge routers (PERs). It will be realised that the network 100, may include any number of LERs 110, 120, 130, 140, 150. LERs 110, 120, 130, 140, 150 operate at a boundary or edge of the MPLS network 100 and apply labels to packets entering the MPLS network 100. Within a core of the MPLS network 100, label switching routers (LSRs) perform switching of packets based upon the attached labels. For clarity, FIG. 1 does not show any LSRs although it will be realised that one or more LSRs may interpose the LERs 110, 120, 130, 140, 150.

A level 2 virtual private network (L2-VPN) may be established over the MPLS network 100 between LERs 110, 120, 130, 140, 150 to provide layer 2 connectivity. The L2 VPN may either be point-to-point (P2P), known as Virtual Private Wire Service (VPWS), or point-to-multipoint (P2MP), known as Virtual Private LAN Service (VPLS). VPWS may be provided over a variety of networks such as Frame Relay, ATM and Ethernet. However, VPLS is generally only provided over Ethernet or an Ethernet VLAN service. VPLS is a layer 2 emulation of an Ethernet LAN. In the case of both VPWS and VPLS, a plurality of pseudowires (PWs) form the L2-VPN. A pseudowire is an emulation of a point-to-point connection oriented service over a packet switched network. A pseudowire is bi-directional and is formed by two unidirectional Virtual Circuit (VC) label switched paths operating in opposed directions. The two VCs forming the PW correspond to a path from one of two end points to the other i.e. a path between two LERs 110, 120, 130, 140, 150. The network 100 of FIG. 1 includes four PWs 115, 125, 135, 145 in the L2-VPN. Each of the PWs 115, 125, 135, 145 is formed by two opposed VCs. PW 115 is formed by unidirectional VCs 115a, 115b between LERs 110, 130 wherein each VC operates in an opposed direction. PW 125 is formed by VCs 125a, 125b; PW 135 is formed by VCs 135a, 135b; and PW 145 is formed by VCs 145a, 145b. As will be noted, even the relatively small L2-VPN shown in FIG. 1 includes a number of PWs, and consequently a larger number of VCs. Embodiments of the invention ease management of VPNs, as will be described.

FIG. 2 illustrates a method 200 according to an embodiment of the invention. The method updates a database or other data storage structure with information concerning the PWs, and the VCs forming the PWs, in the network 100 shown in FIG. 1.

Figure 2A:
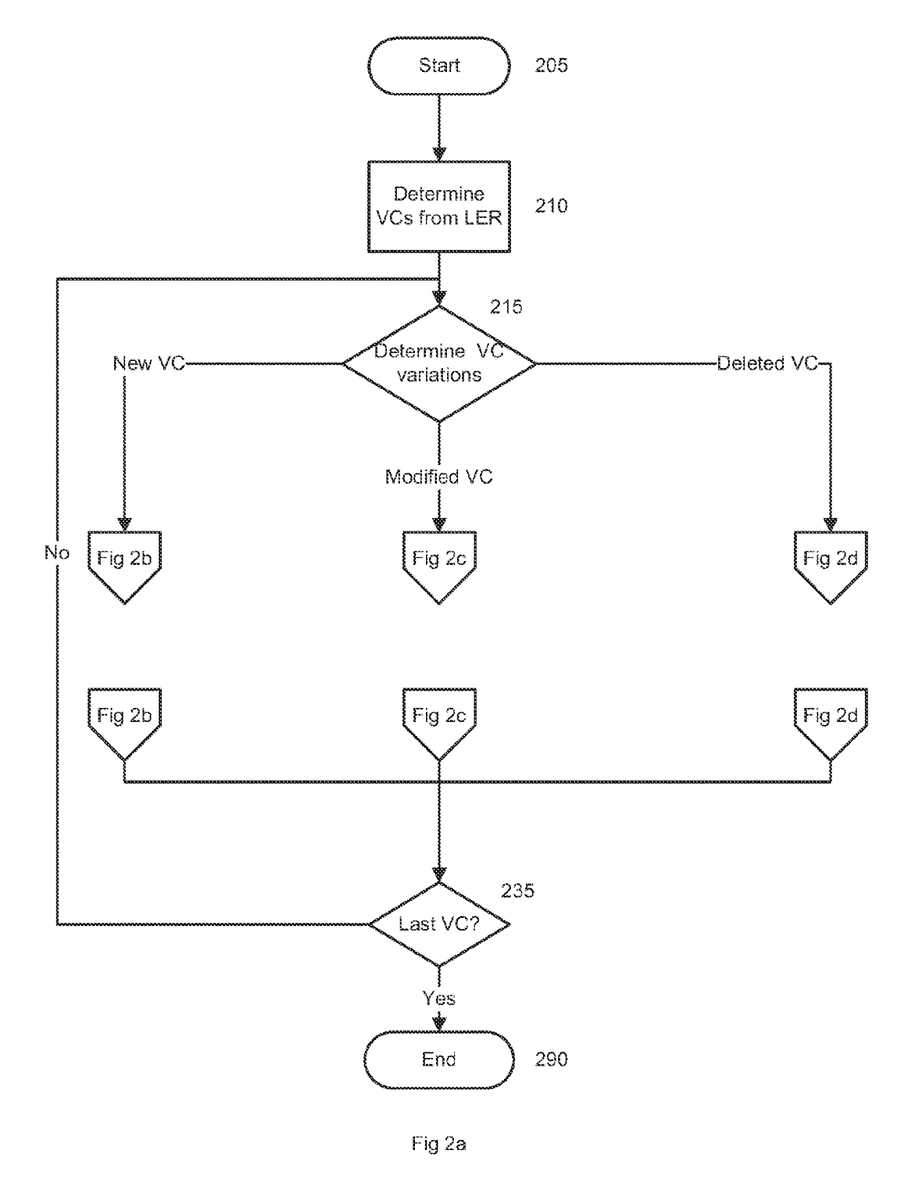
FIG. 2 shows an illustration of a method according to an embodiment of the invention.

The method 200 begins in step 205 shown in FIG. 2(a). Each iteration of the method 200 is performed with respect to one or more of the LERs 110, 120, 130, 140, 150 shown in FIG. 1. For example, during a first iteration the method 200 is performed with respect to LER 110, although it will be realised that the method 200 may be performed with respect to any of the LERs 110, 120, 130, 140, 150 in the first iteration.

In step 210 the VCs originating from the LER 110 are determined As will be explained, the VCs 115a, 145b originating from the LER 110 are determined by interrogating the LER 110, as will be explained. In step 215 it is determined whether there are any variations or changes to the VCs 115a 145b originating from the LER 110. The variations may be an addition of one or more VCs, a modification or change to details of one or more of the VCs 115a, 145b originating from the LER 110 and/or a deletion or removal of one or more VCs known to previously originate from the LER 110. In a first iteration of the method, where initially no VCs are known to originate from the LER 110, only the addition of new VCs 115a, 145b, is determined.

Figure 2B:
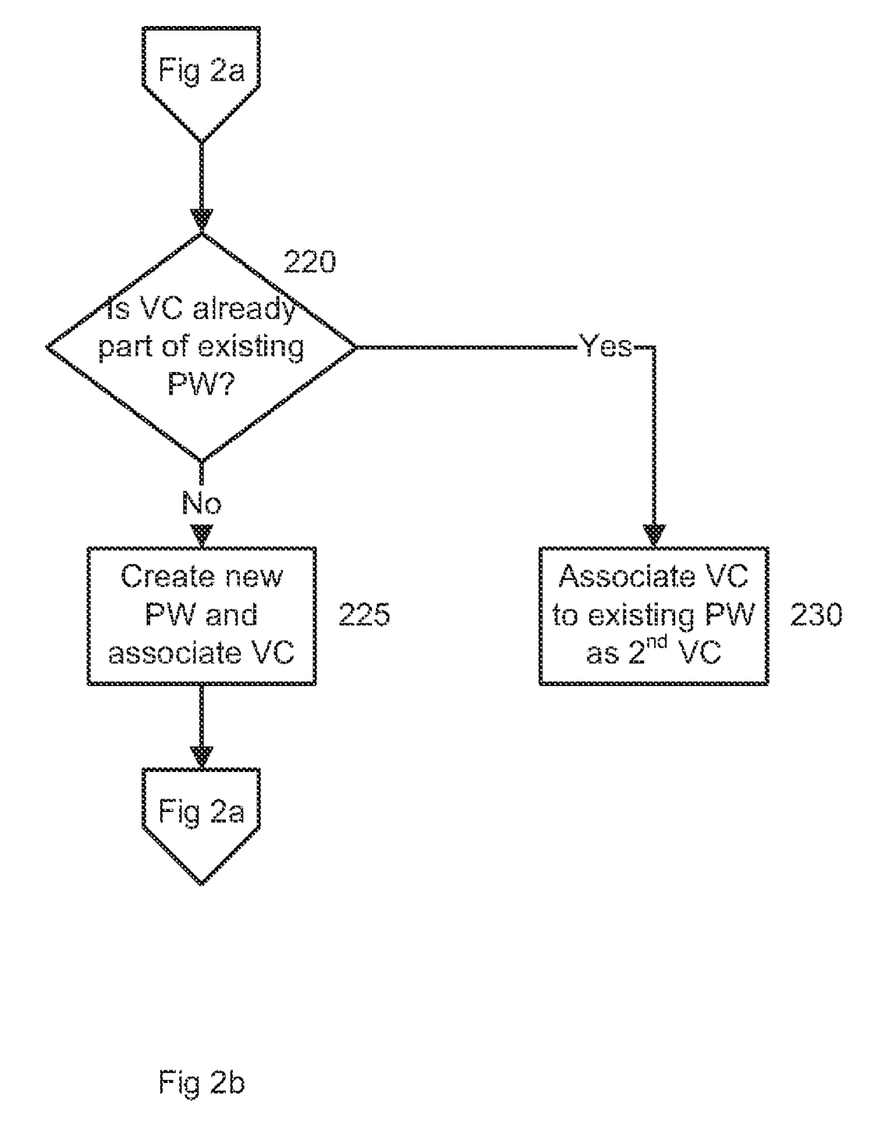

Method steps illustrating the addition of VCs 115a, 145b originating from the LER 110 will now be explained with reference to FIG. 2(b). In step 220 it is determined whether each VC 115a, 145b forms part of a known or existing PW. In the first iteration of the method 200, for the first VC, e.g. VC 115a, no PWs initially exist in the database. Therefore the method moves to step 225 wherein a new PW 115 is added to the database and details of the VC 115a entered in the database and are associated with that PW 115. However, if in step 220 it had been determined that the VC 115a formed part of a known PW, then in step 230 the VC 115a is associated with that PW in the database.

In step 235 shown in FIG. 2(a) it is determined whether any VCs identified from that LER 110 remain to be considered. If the previously considered VC 115a is the last VC identified to originate from the LER 110 then the method ends in step 290. However, if one or more further VCs 145b are to be considered, then the method returns to step 215 where it is determined if the remaining VC 145b is a new VC or is a VC whose details differs from its current entry in the database. For example, the second VC identified from the LER 110 in the first iteration of the method 200 is VC 145b which does not currently exist in the database and is therefore added to the database as forming part of a newly identified PW 145 in step 225.

Following the first iteration of the method 200 with respect to LER 110 the database contains the information shown in Table 1:

TABLE 1

| VC | PW | Origin LER |
|---|---|---|
| 115a | 115 | 110 |
| 145b | 145 | 110 |

It will be realised that the database may contain additional information to that shown in Table 1 and that the information may be stored in a differently formatted data structure or table to that shown.

Once all VCs 115a, 145b with respect to a LER 110 have been identified in a first iteration of the method 200, the method 200 may be repeated for one or more additional LERs 120, 130, 140, 150. A next LER may be selected in an appropriate manner. For example, LER 120 may be selected as a LER having a next or sequential ID value. The method 200 is then repeated for that LER 120 which results in a further VC 125a originating from LER 120 being added to the database and associated with a new PW 120. Following the second iteration of the method with respect to LER 120 the database contains the information shown in Table 2:

TABLE 2

| VC | PW | Origin LER |
|---|---|---|
| 115a | 115 | 110 |
| 125a | 125 | 120 |
| 145b | 145 | 110 |

Further iterations of the method 200 are then performed with respect to LERs 130, 140 and 150 such that the database contains the information shown in Table 3:

TABLE 3

| VC | PW | Origin LER |
|---|---|---|
| 115a | 115 | 110 |
| 115b | 115 | 130 |
| 125a | 125 | 120 |
| 125b | 125 | 140 |
| 135a | 135 | 130 |
| 135b | 135 | 140 |
| 145a | 145 | 150 |
| 145b | 145 | 110 |

In some embodiments of the invention, each LER 110, 120, 130, 140, 150 may be queried or interrogated to obtain one or more of: a VC ID, a source node for each VC and a peer address.

Figure 2C:
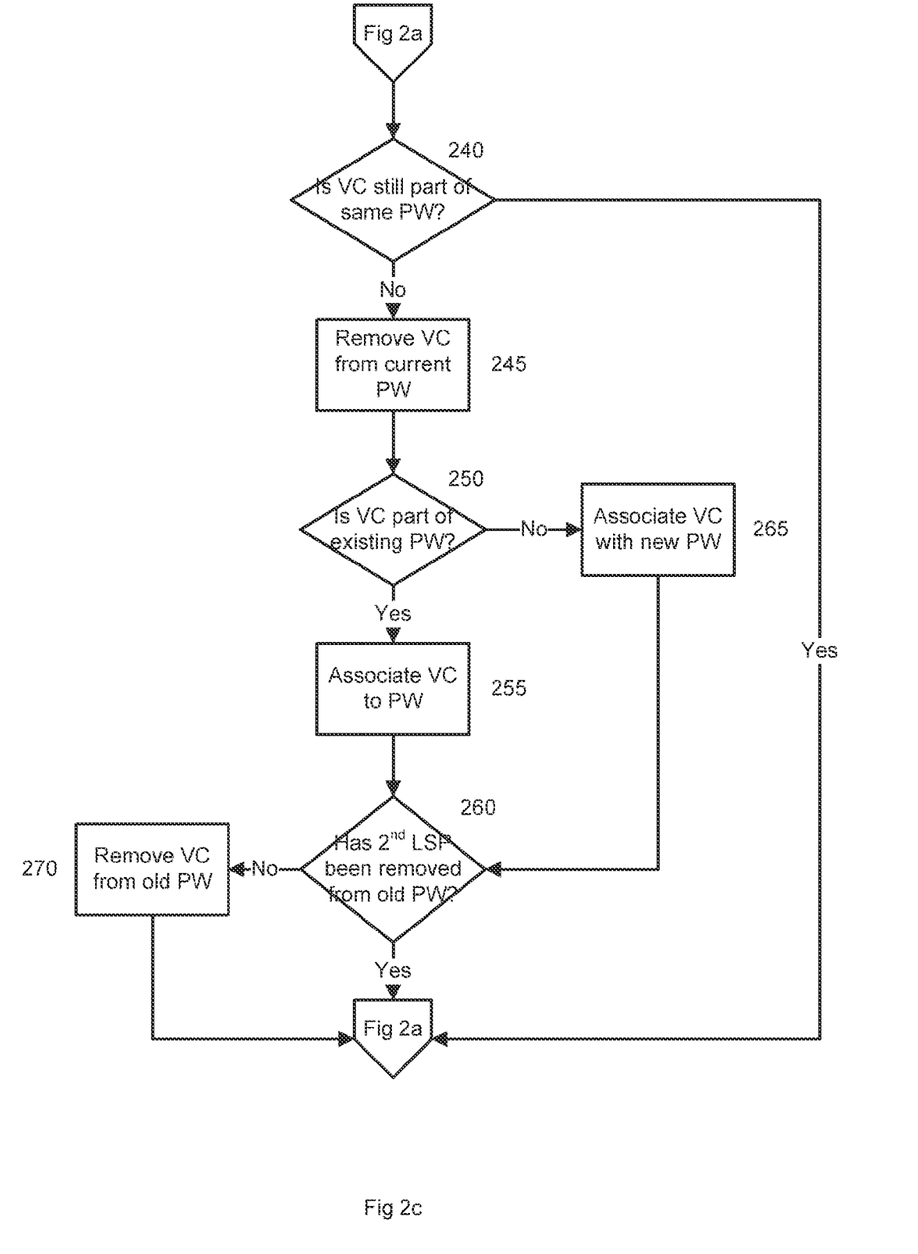
Figure 2D:
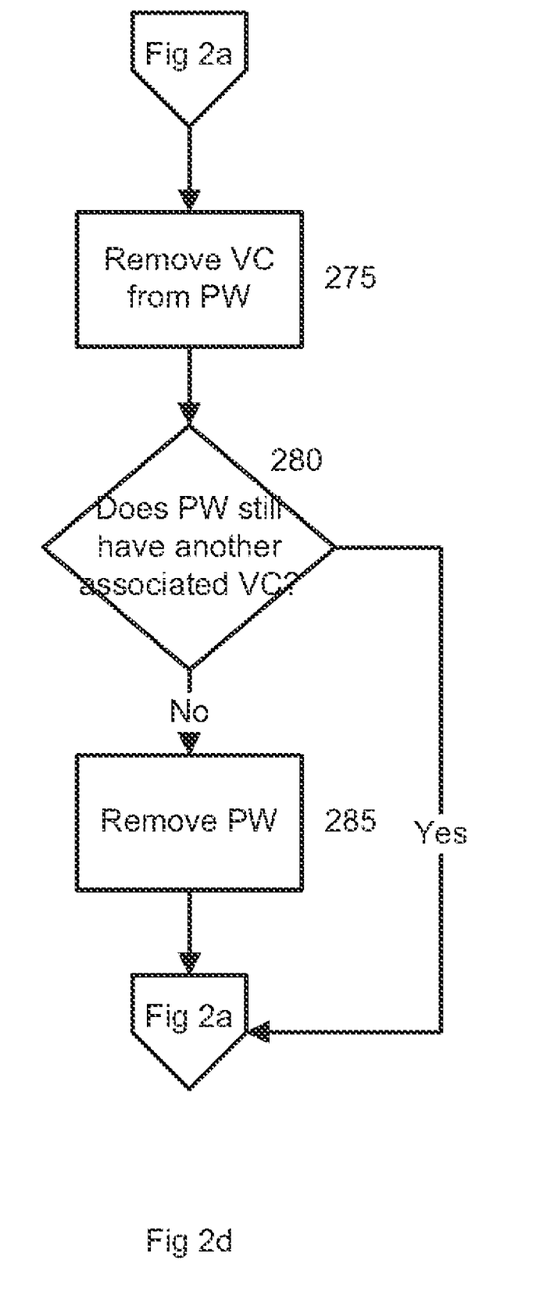

Operation of the method 200 will now be further explained with reference to FIG. 2(c), (d) and FIG. 3.

Figure 3:
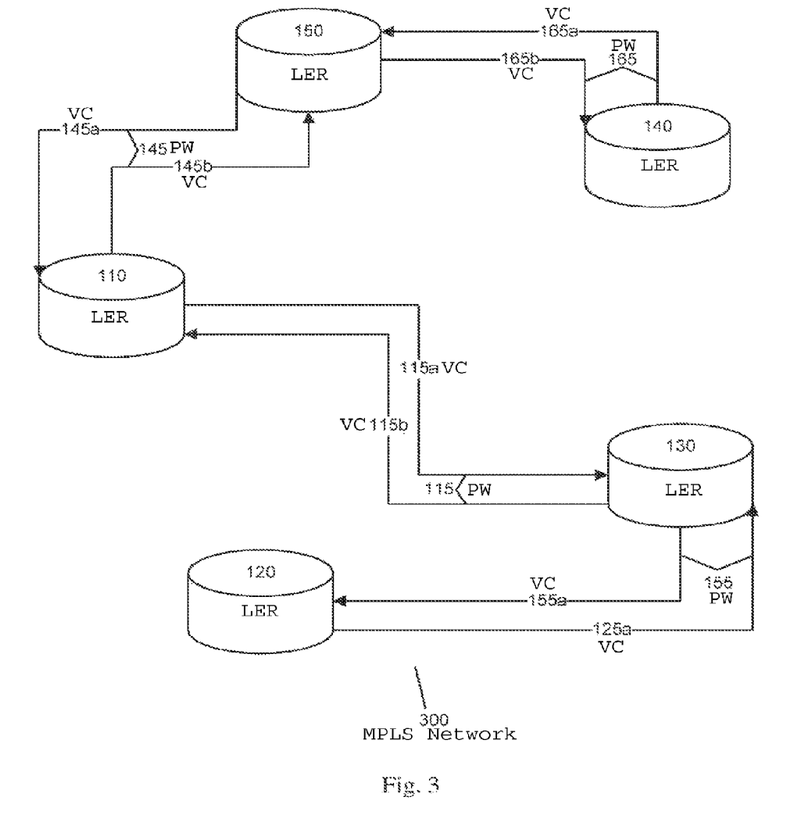
FIG. 3 shows a further example of a MPLS network.

Referring to FIG. 3, a schematic of a further MPLS network 300 is shown which is based upon that shown in FIG. 1. In particular, the network 300 of FIG. 3 differs from that shown in FIG. 1 in that the PW 135 has been deleted, a new PW 155 has been introduced between LERs 120 and 130, PW 155 being formed by the VCs 125a which has been modified accordingly and a new VC 155a, and a new PW 165 introduced between LERs 140 and 150. As a result of one or more previous iterations of the method 200 performed on network 100 shown in FIG. 1 the database contains the information shown in Table 3, as shown above.

During a first subsequent iteration of the method 200 on the network shown in FIG. 3 with respect to LER 110, it is determined in step 215 that no new VCs originate from LER 110, that no modifications have been made to VCs 115a, 145b originating from LER 110 and that no VCs have been deleted from LER 110 i.e. that all previous VCs 115a, 145b still originate from LER 110. Therefore, no changes are made to the database as a result of interrogating LER 110.

In a second subsequent iteration of the method 200 with respect to LER 120 it is determined in step 215 that the VC 125a originating from LER 120 has been modified i.e. that details associated with VC 125a have changed. As a result, the method moves to step 240 shown in FIG. 2c where it is determined whether the VC 125a continues to form part of the PW 125 as currently identified in the database. Since VC 125a does not form part of PW 125 the method moves to step 245 where the VC 125a is disassociated with the old PW 125 i.e. the entry 125 in the PW column of Table 3 associated with VC 125a is deleted. In step 250 it is determined whether the VC 125a forms part of an existing PW i.e. a PW already identified in the database. As VC 125a forms part of a new PW 155 the method moves to step 265 where the VC 125a is associated in the database with the new PW 155, as shown in Table 4:

TABLE 4

| VC | PW | Origin LER |
|---|---|---|
| 115a | 115 | 110 |
| 115b | 115 | 130 |
| 125a | 155 | 120 |
| 125b | 125 | 140 |
| 135a | 135 | 130 |
| 135b | 135 | 140 |
| 145a | 145 | 150 |
| 145b | 145 | 110 |

Then in step 260 it is determined whether the other VC 125b forming part of the PW 125 from which the VC 125a has been disassociated still exists in the database. As the PW 125 is still associated with the VC 125b it is not removed from the database in step 270, so the method 200 returns to FIG. 2*a*.

If, in step 250 it had been determined that the VC 125a had been modified to form part of an existing PW then it would have been associated with that PW in step 255 before the method moved to step 260.

In a further iteration of the method 200 performed with respect to LER 130 a new VC 155a forming part of the PW 155 is added to the database, as previously described. Furthermore, in step 215 it is determined that VC 135a previously originating from LER 130 has been removed from the network 300. The method 200 therefore moves to step 275 in FIG. 2(*d*) wherein VC 135a is dissociated with the PW 135. In step 280 it is determined whether the PW 135 from which the VC 135a has been dissociated continues to have any other VCs associated. Since PW 135 still has the VC 135b associated, the method returns to FIG. 2*a*. However, if PW 135 did not have any VCs still associated, it would be removed from the database in step 285.

During further iterations of the method 200 with respect to LERs 130, 140, 150 the database is updated to contain the data shown in Table 5:

TABLE 5

| VC | PW | Source LER |
|---|---|---|
| 115a | 115 | 110 |
| 115b | 115 | 130 |
| 125a | 155 | 120 |
| 145a | 145 | 150 |
| 145b | 145 | 110 |
| 155a | 155 | 130 |
| 165a | 165 | 140 |
| 165b | 165 | 150 |

A PW is said to be completely discovered when both VCs forming the PW have been discovered. When querying LERs in the network 100, each LER may be queried, for each VC, for an ID of each VC label switched path, a source node (although this may be determined from the LER providing details of the VC i.e. that LER is the source node, and/or peer address of the VC. If an ID of two VCs match (LER1.VCID==LER2.VCID) then by comparing source node and peer nodes of two VCs it may be determined that the VCs form a PW.

A type, e.g. either VPWS or VPLS, of each discovered PW may be determined In some embodiments, the type of each VPN is determined by querying the LER and determining the type of the VPN according to the LER's response.

LERs manufactured by Juniper Networks, Inc may be queried for a table JnxVpnPwTable which contains an index JnxVpnPwVpnType which identifies the VPN type. If the VPN type is either bgpVpls or ldpVpls then the PW may be determined to be VPLS. If the VPN type is l2Circuit then the PW type may be determined to be VPWS.

With respect to LERs manufactured by Cisco Systems, Inc, attachment circuit information is used for the determination of VPN type. VPLS is point-to-multipoint Ethernet only L2-VPN service, whereas VPWS is based on Any Transport On MPLS (ATOM) and can utilise various layer 2 technologies such as frame relay, ATM, Ethernet etc. Therefore, embodiments of the invention determine the VPN type with reference to Cisco routers according to attachment circuit information.

Attachment circuit properties may be determined using a table called "cpwVcEnetTable" in CISCO-IETF-PW-ENET-MIB. The PW type may be determined as VPWS by the presence of attachment circuit details in CISCO-IETF-PW-ENET-MIB for Ethernet. In contrast, the PW type is determined to be VPLS if both end points of the PW carry Ethernet traffic and both attachment circuit properties are not reported in CISCO-IETF-PW-ENET-MIB.

Embodiments of the present invention determine PWs forming a VPN by grouping the PWs according to information associated with each PW.

For a VPLS VPN with n endpoints there are $$\frac{n(n-1)}{2}$$

PWs in a full mesh network. All of the PWs in the VPLS VPN have a matching VC ID. Therefore, in order to determine all VCs in the VPN, embodiments of the invention group VCs according to their VC ID. For example, all VCs having the same VC ID, e.g. a VC ID of 125, are grouped together to form the VPN. Some embodiments of the invention automatically name the VPN based upon the VC ID of VCs forming the VPN. For example, the VPN name may be a combination of the VPN type and VC ID such as VPLS_125. However embodiments of the invention allow a user to rename the VPN to a user-determined VPN name.

Grouping according to VC ID may be performed for VPWS VCs as described above. For example, all PWs having a particular VC ID may be grouped under a group VPWS_V-CID wherein VCID is the VC ID of the PWs e.g. VPWS_850 for a VC ID of 850. However, an organisation may not use matching VC IDs for all PWs in a VPWS VPN. In this situation, multiple groups could be created which each contain a single PW.

In order to more effectively group PWs, embodiments of the invention group PWs according to user-defined criteria. In particular, the criteria may be defined by the user as one or more of: a range of VC IDs, e.g. to group all PWs having a VC ID within a range of 200-500 or to group PWs having a VC ID in a predetermined list e.g. 200, 250, 275, 300 and/or 500; to group all PWs together except for certain identified PWs, e.g. to exclude PWs having particular VC IDs such as 225, 230 or in a range of VC IDs such as 280-290; to group PWs according to nodes with which they are associated or PWs participating in a node group, wherein a node group is one or more nodes (LERs) defined to form the node group according to information associated with each node such as device information (vendor, family, category etc.), host name etc., all PWs associated with nodes in the node group e.g. originating from or ending at a node in the node group would then be associated with the group of PWs; to group PWs by a description associated with each PW wherein a string expression is defined and matched against a description associated with each PW in a Management Information Base (MIB); or to group PWs according to an encapsulation type, e.g. Frame Relay, ATM, HDLC etc., such that all PWs of the same encapsulation type are grouped together. A configuration GUI may be provided for a user to establish a rules base by which the PWs, particularly in a VPWS VPN, are to be grouped. Furthermore, in some embodiments of the invention, a default group is provided into which is grouped any PWs which have not otherwise been grouped.

Embodiments of the invention determine a status of a VPN. The status of a VPN may be determined based upon the status of PWs participating in the VPN, the status of which may be determined from VCs forming each PW.

In embodiments of the invention, the status of the VPN is determined by examination of a corresponding PW-MIB. In some embodiments, the VPN is determined to be "NORMAL", or operating correctly, when greater than or equal to a predetermined percentage of the PWs forming the VPN have a "NORMAL" status. The predetermined percentage may be, in some embodiments, 100% of PWs forming the VPN. When some of the PWs forming the VPN have the "NORMAL" status and some have a status of "CRITICAL", the status of the VPN may be determined to be one of "MAJOR" or "MINOR" depending on the number, or percentage, of PWs being "NORMAL" and "CRITICAL". If greater than a predetermined percentage of PWs have the "CRITICAL" status then the status of the corresponding VPN is determined to be "CRITICAL". The predetermined percentage corresponding to the VPN status critical may be 80 or 90%. Furthermore, embodiments of the present invention also support user-defined VPN status levels. For example: a user may define that if 30% of PWs forming the VPN do not have a "NORMAL" status, then the corresponding VPN status is determined to be "MINOR"; similarly, if 50% of the PWs do not have the "NORMAL" status then the corresponding VPN status is "MAJOR"; and if 80% of the PWs do not have the "NORMAL" status then VPN status is determined to be "CRITICAL".

Referring to FIGS. 4-12, embodiments of the present invention provide a GUI by which one or more VPNs, including the PWs and VCs forming the VPNs, may be managed. The GUI allows a user to visualise the structure of the VPNs and of status information associated with each VPN.

Figure 4:
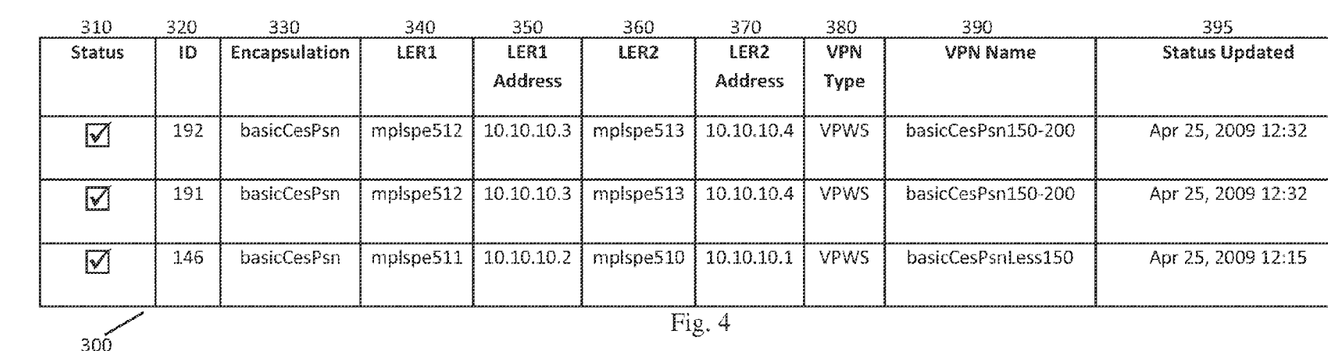
FIG. 4 is an illustration of a screenshot of a pseudowire virtual circuit inventory view of a GUI according an embodiment of the invention.

FIG. 4 provides an illustration of a screenshot of a pseudowire virtual circuit inventory view 300 of the GUI. The inventory 300 provides a visual list of one or more VCs and provides an indication of a status 310 of each VC, the VC's ID 320, information identifying an encapsulation type 330 of the VC, information identifying source 340 and peer nodes 360 of the VC and their respective IP addresses 350, 370, an indication of the VPN type 380 and a name 390 of the VPN which the VC forms a part of, and information indicating when the status of the VC was last updated.

Figure 5:
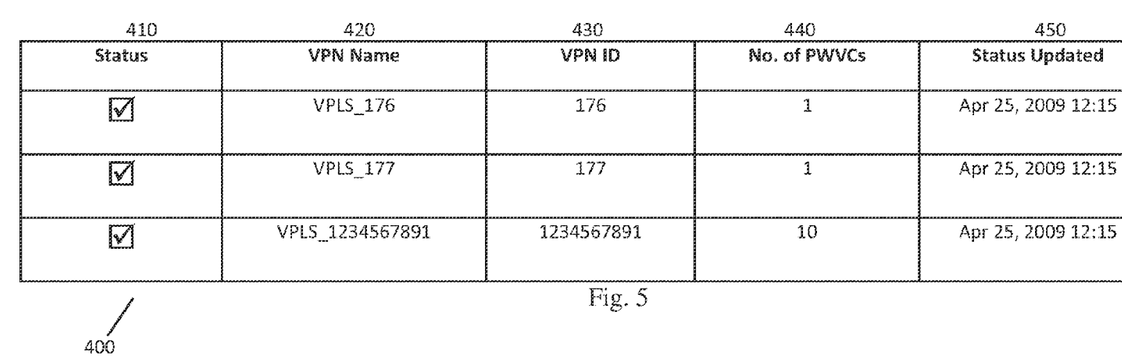
FIG. 5 is an illustration of a screenshot of a VPLS virtual private network inventory view of the GUI shown in FIG. 4.

FIG. 5 provides an illustration of a screenshot of a VPLS VPN view 400 of the GUI. The VPLS VPN view 400 lists one or more VPNs and provides an indication of a status 410 of each VPN, information identifying each VPN i.e. the VPN name 420, the VPN ID 430, information indicating a number 440 of VCs forming each VPN and an indication 450 of when the status of each VPN was last updated. It will be realised that an equivalent view for a VPWS VPN may be provided.

Figure 6:
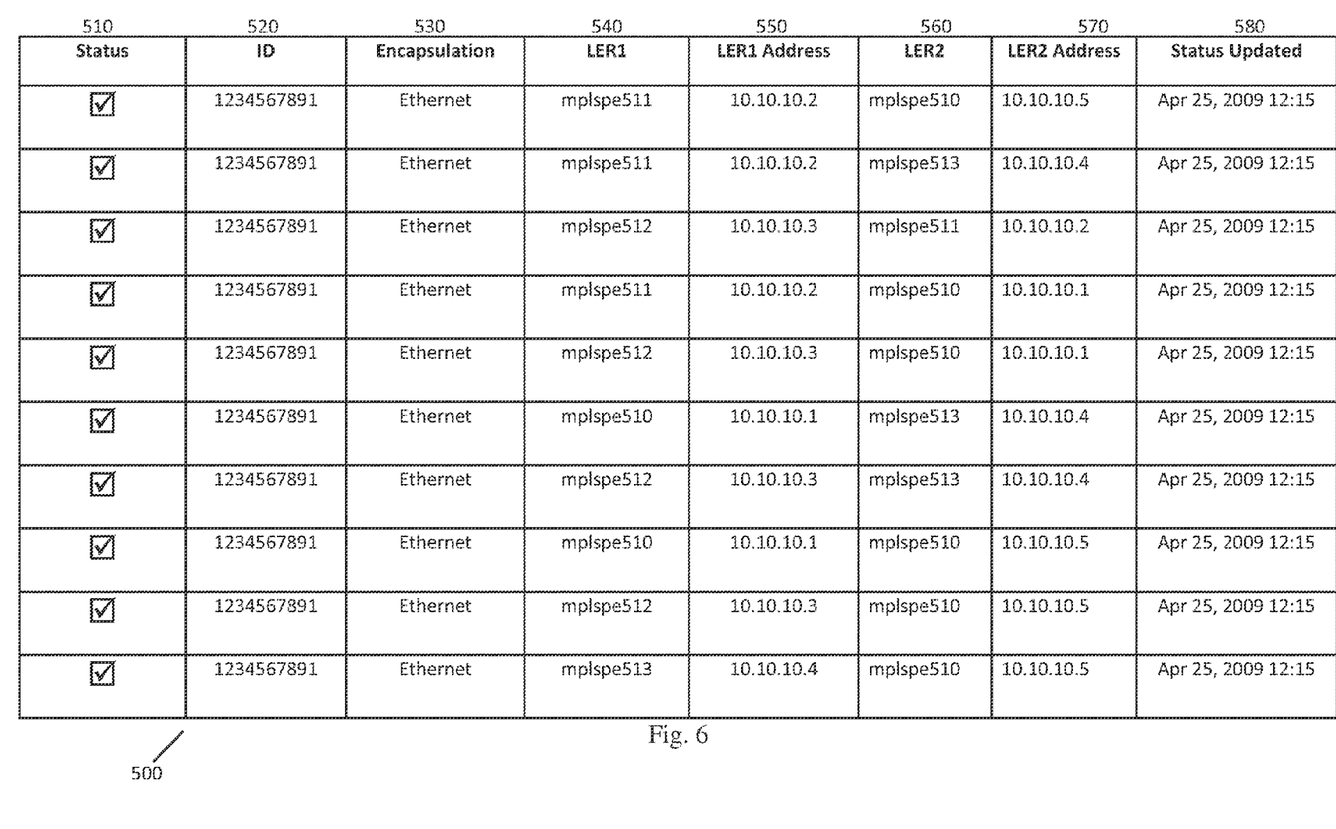
FIG. 6 is an illustration of a VPLS virtual private network form of the GUI shown in FIG. 4 which provides a graphical indication of all pseudo-wires participating in the VPLS virtual private network.

FIG. 6 provides an illustration of a VPLS VPN form 500 which provides a graphical indication of all PWs participating in a particular VPN. The form 500 provides an indication of a status 510 of each PW in the VPN, an ID 520 of each PW, an indication of an encapsulation type 530 of each PW, information identifying source 540 and peer nodes 560 of each PW and their respective IP addresses 550, 570 and an indication 580 of when the status of each PW was last updated.

Figure 7:
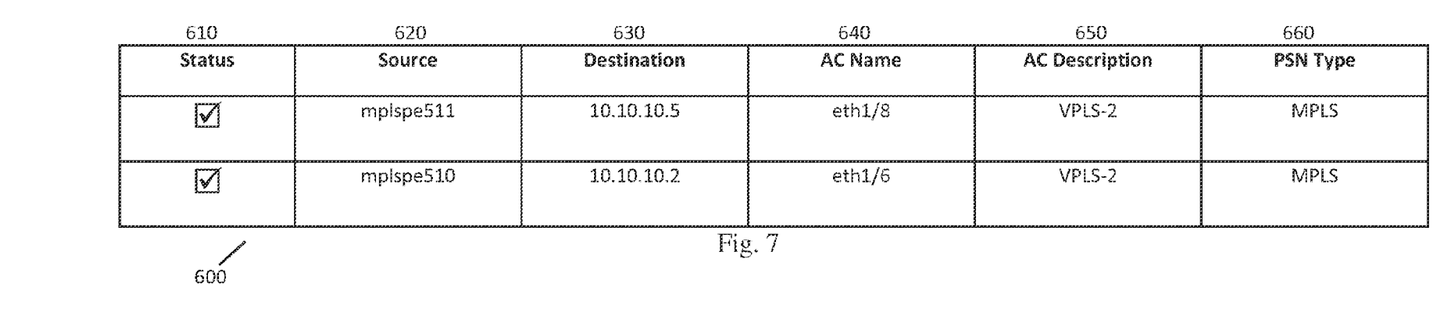
FIG. 7 is an illustrates a pseudowire form of the GUI shown in FIG. 4 which identifies the virtual circuits in a selected pseudo-wire.

FIG. 7 illustrates a pseudowire form 600, launched from the VPLS VPN form 500 shown in FIG. 5, which identifies the VCs in a selected PW. The form 600 provides an indication of the status 610 of each VC, information identifying the source 620 and destination 630 nodes of each VC, information representing the Attachment Circuit (AC) name 640 and Attachment Circuit (AC) description 650, and an indication of a packet-switched network type 660.

Figure 8:
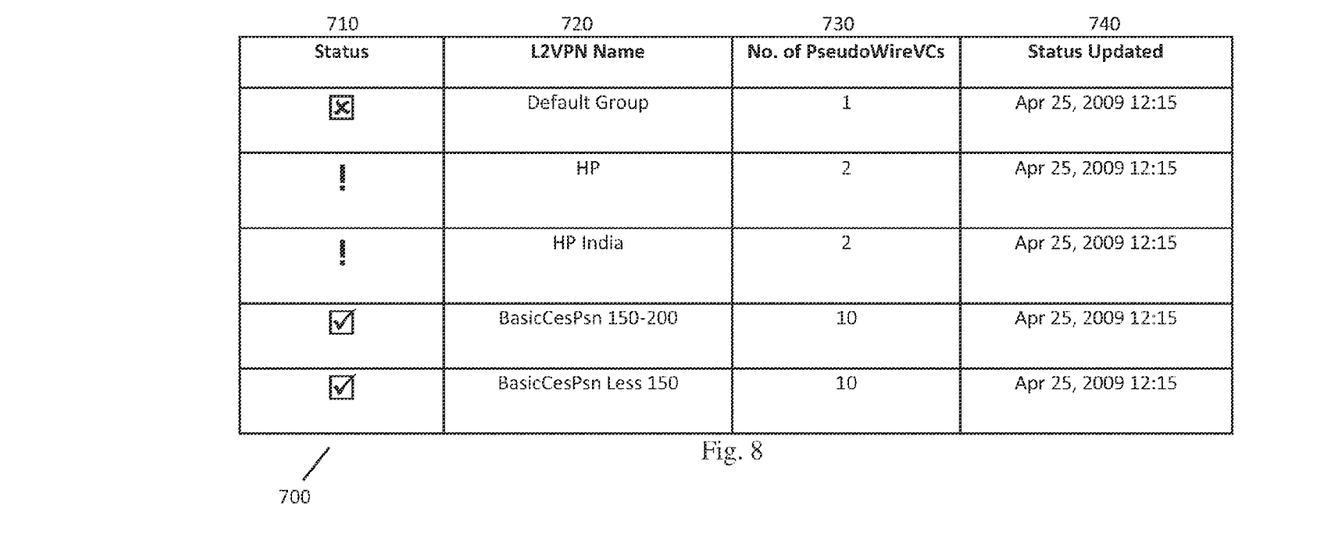
FIG. 8 is an illustration of a VPWS virtual private network inventory view of the GUI shown in FIG. 4.

FIG. 8 illustrates a VPWS VPN inventory view 700 of the GUI. The inventory view 700 shows a list of VPWS VPNs and provides an indication of an overall status 710 of each VPN, identification information for each VPN in the form of the VPN name 720, an indication of a number 730 of a number of PWs in each VPN and an indication 740 of when the status of each VPN was last updated. It will be noted that column 710 shows that the status of the "Default Group" VPN is non-operational or in error, whereas the status of the HP and HP India VPNs is cautionary. A non-operational status may be determined when no PWs in the group are operational, whereas a cautionary status may be determined when less that a predetermined percentage of PWs in the group are operational.

Figure 9:
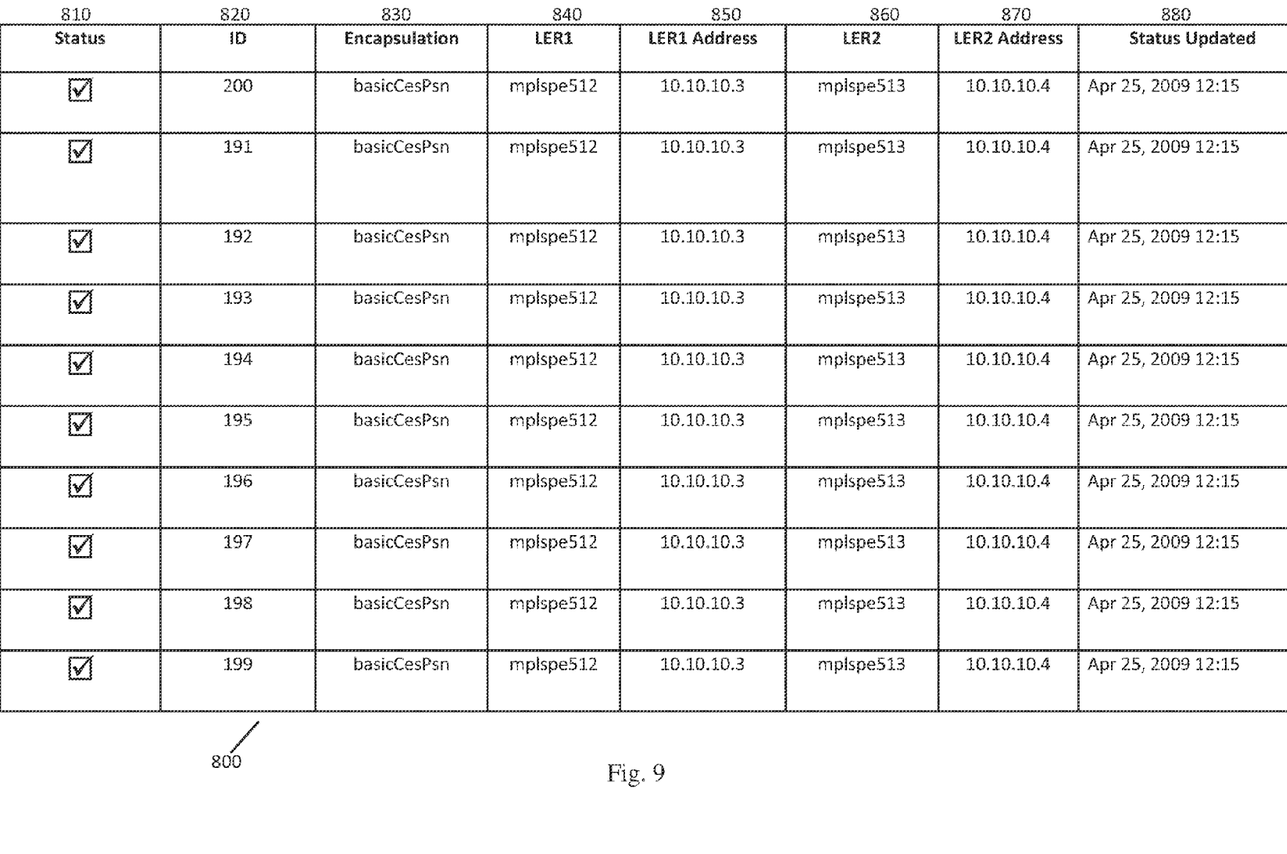
FIG. 9 is an illustration of a VPWS virtual private network form of the GUI shown in FIG. 4 which lists pseudowires participating in the VPWS virtual private network.

FIG. 9 is a VPWS VPN form 800 listing PWs forming the BasicCesPsn150-200 group listed in row 4 of the inventory view 700 of FIG. 7. The VPWS VPN form 800 may be launched by selecting the appropriate VPN from the inventory view 700. The VPWS VPN form 800 provides an indication of an overall status 810 of each PW in the VPN, an encapsulation type 820 of each PW, information identifying source 840 and peer nodes 860 of each PW and their respective IP addresses 850, 870 and an indication 880 of when the status of each PW was last updated.

Figure 10:
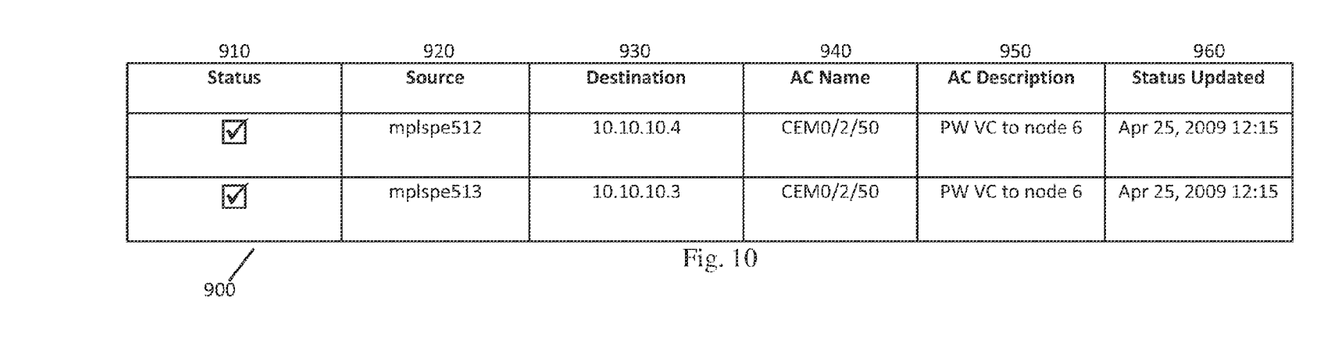
FIG. 10 is an illustration of a VPWS pseudowire form of the GUI shown in FIG. 4 which lists the virtual circuits forming a selected pseudowire of the VPWS virtual private network.

FIG. 10 is a pseudowire form 900 listing the VCs forming a PW selected from the form 800 shown in FIG. 8. The form 900 provides an indication of an overall status 910 of each VC forming the selected pseudowire, information identifying the source and destination nodes of the VCs 920, 930, information requesting the Attachment Circuit (AC) name 940 and AC description 950 and an indication 960 of when a status of each VC was last determined.

Figure 11:
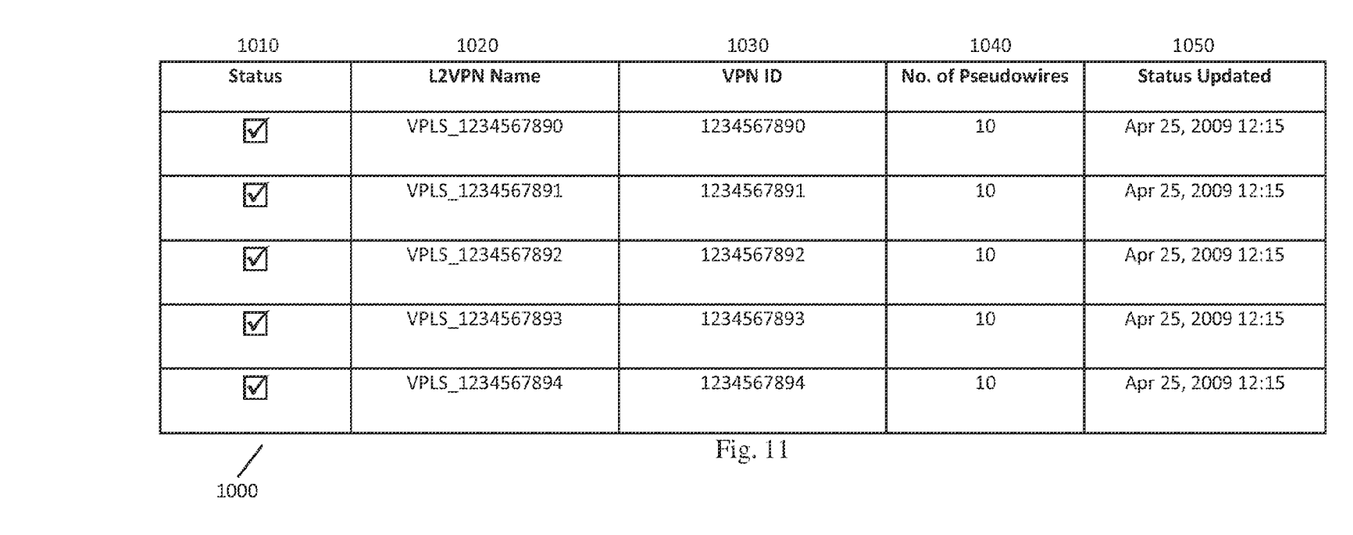
FIG. 11 is an illustration of a node-centric VPLS virtual private network form of the GUI shown in FIG. 4.

FIG. 11 illustrates a node-centric VPLS VPN form 1000 which provides information on all VPLS VPNs associated with a particular node. The form 1000 provides an indication of an overall status 1010 of each VPN, a name of each VPN 1020, a VPN ID 1020, an indication 1030 of a number of PWs participating in each VPN and an indication of when 1050 the status of each VPN was last updated.

Figure 12:
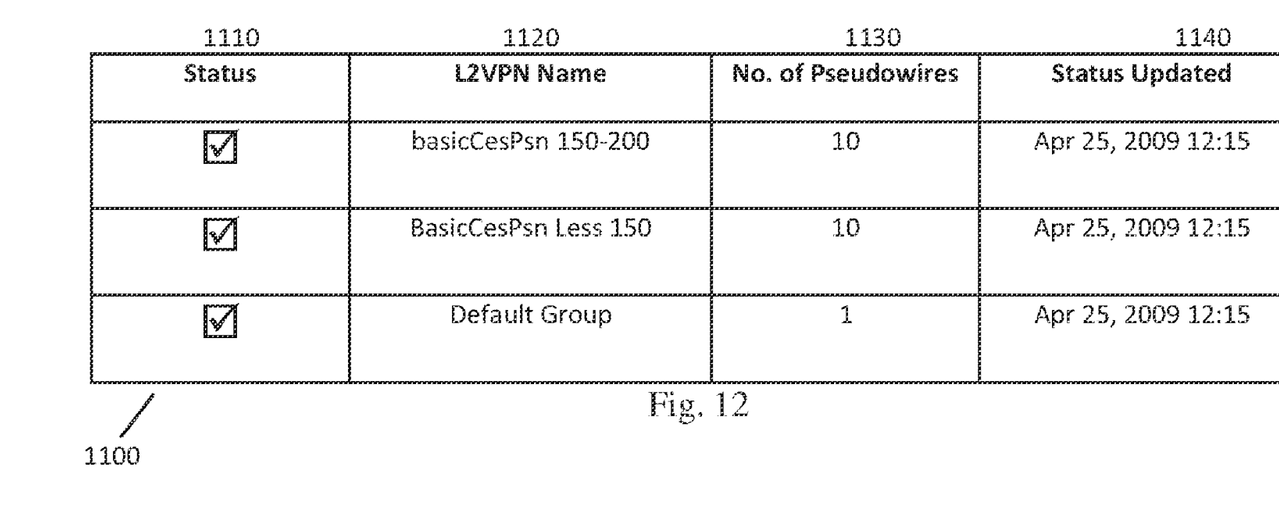
FIG. 12 is an illustration of a node-centric VPWS virtual private network form of the GUI shown in FIG. 4.

Similarly, FIG. 12 illustrates a node-centric VPWS VPN form 1100 which provides information on all VPWS VPNs associated with a particular node. The form 1100 provides an indication of an overall status 1110 of each VPN, a VPN Name 1120, an indication 1130 of a number of PWs participating in each VPN in 1130 and an indication of when the status of each VPN was last updated in 1140.

It will be realised that various embodiments of the invention may not include all of the information columns of the screenshots shown in FIGS. 4-11.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method of providing network information, comprising:
    determining information associated with each of a plurality of label switched paths between nodes in the network;
    determining, by a processor, pseudowires between the nodes in the network based upon the information associated with each of the plurality of label switched paths;
    grouping the pseudowires, according to information associated with each pseudowire and one or more predetermined criteria, into one or more groups each representing a virtual private network (VPN);
    providing a graphical user interface (GUI) displaying information associated with at least one of the groups of pseudowires.

2. The method of claim 1, wherein the information associated with the plurality of label switched paths comprises information identifying a source node and a peer node of the label switched paths, and the pseudowires are determined based upon the respective source and peer nodes of the label switched paths.

3. The method of claim 1, wherein the pseudowires are grouped according to identification information associated with each label switched path forming the respective pseudowires.

4. The method of claim 3, wherein the identification information is a virtual circuit ID and the pseudowires are grouped into groups according to one or more predetermined criteria based upon their respective virtual circuit IDs.

5. The method of claim 1, comprising determining a type of the VPN and displaying in the GUI an indication of the VPN type.

6. The method of claim 5, wherein the type the VPN is selected as one of Virtual Private Wire Service (VPWS) or Virtual Private LAN service (VPLS).

7. The method of claim 5, wherein the type of the VPN is determined by interrogating one or more label edge routers.

8. The method of claim 1, wherein the GUI displays an indication of the one or more pseudowires in each group.

9. The method of claim 1, wherein the pseudowires are determined by interrogating a plurality of label edge routers in the network.

10. A method of providing network information, comprising:
    determining information associated with each of a plurality of label switched paths between nodes in the network;
    determining, by a processor, pseudowires between the nodes in the network based upon the information associated with each of the plurality of label switched paths;
    grouping the pseudowires, according to information associated with each pseudowire and one or more predetermined criteria, into one or more groups each representing a virtual private network (VPN), wherein the information associated with each pseudowire includes a virtual circuit ID associated with each label switched path forming the respective pseudowire and
    the pseudowires are grouped according to one or more of an encapsulation type, a description associated with each pseudowire and/or information associated with the nodes connected by the pseudowires; and
    providing a graphical user interface (GUI) displaying information associated with at least one of the groups of pseudowires.

11. A method of providing network information, comprising:
    determining information associated with each of a plurality of label switched paths between nodes in the network;
    determining, by a processor, pseudowires between the nodes in the network based upon the information associated with each of the plurality of label switched paths;
    grouping the pseudowires, according to information associated with each pseudowire and one or more predetermined criteria, into one or more groups each representing a virtual private network (VPN);
    providing a graphical user interface (GUI) displaying information associated with at least one of the groups of pseudowires;
    determining a status of each pseudowire;
    displaying an indication of the status of one or more of the pseudowires in the GUI; and
    determining a status of the VPN based upon the status of one or more pseudowires forming the VPN.

12. The method of claim 11, wherein the status of the VPN is determined based upon the status of a percentage of pseudowires forming the VPN.

13. A non-transitory computer-readable storage medium having instructions stored thereon which, when executed by a computer, result in the computer to:
    determine information associated with each of a plurality of label switched paths between nodes in the network;
    determine pseudowires between the nodes in the network based upon the information associated with each of the plurality of label switched paths;
    group the pseudowires, according to information associated with each pseudowire and one or more predetermined criteria, into one or more groups each representing a virtual private network (VPN); and provide a graphical user interface (GUI) displaying information associated with at least one of the groups of pseudowires.

14. The non-transitory computer-readable storage medium of claim 13, wherein the information associated with each pseudowire includes a virtual circuit ID associated with each label switched path forming the respective pseudowire and the one or more predetermined criteria is based upon the pseudowires respective virtual circuit IDs.

* * * * *